United States Patent
Gil Gonzalez

(10) Patent No.: US 10,645,910 B1
(45) Date of Patent: May 12, 2020

(54) SYSTEM, METHOD, AND APPARATUS FOR ATTRACTING HONEY

(71) Applicant: Leopoldo Gil Gonzalez, Calgary (CA)

(72) Inventor: Leopoldo Gil Gonzalez, Calgary (CA)

( * ) Notice: Subject to any disclaimer, the term of this patent is extended or adjusted under 35 U.S.C. 154(b) by 436 days.

(21) Appl. No.: 15/690,990

(22) Filed: Aug. 30, 2017

Related U.S. Application Data

(60) Provisional application No. 62/381,195, filed on Aug. 30, 2016.

(51) Int. Cl.
*A01K 59/00* (2006.01)

(52) U.S. Cl.
CPC .................................. *A01K 59/00* (2013.01)

(58) Field of Classification Search
CPC ........ A01K 59/00; A01K 59/02; A01K 59/04; A01K 59/06
See application file for complete search history.

(56) References Cited

U.S. PATENT DOCUMENTS

| | | | |
|---|---|---|---|
| 2,448,775 A | 9/1948 | Crane | |
| 2,580,397 A * | 1/1952 | Bogenschutz | A01K 59/02 449/54 |
| 2,807,034 A * | 9/1957 | Fox | A01K 59/02 449/55 |
| 3,068,496 A | 12/1962 | Owens | |
| 3,535,721 A | 10/1970 | Bell, Jr. | |
| 3,789,443 A | 2/1974 | Cowen | |
| 4,765,008 A * | 8/1988 | Gunness | A01K 59/02 449/54 |
| 5,326,304 A | 7/1994 | Horr | |
| 6,193,583 B1 | 2/2001 | Gunness | |
| 9,826,721 B2 * | 11/2017 | Anderson | A01K 59/00 |
| 2018/0035651 A1 * | 2/2018 | Anderson | A01K 47/04 |

* cited by examiner

*Primary Examiner* — Brian M O'Hara
(74) *Attorney, Agent, or Firm* — Cramer Patent & Design, PLLC; Aaron R. Cramer

(57) ABSTRACT

An apparatus for extracting honey from a silicone honeycomb frame includes a base having a central longitudinal axis, a laterally opposed pair of conveyor belts extending parallel with the central longitudinal axis of the base, a drive motor operatively coupled with the pair of conveyor belts, and an opposed pair of scraping spatulas connected to the base and transversing the central longitudinal axis of the base. The pair of conveyor belts is configured to engage the silicone honeycomb frame and move the silicone honeycomb frame along the central longitudinal axis between the pair of scraping spatulas. The pair of scraping spatulas is configured extract the honey from the silicone honeycomb frame as the silicone honeycomb frame passes between the pair of scraping spatulas.

20 Claims, 7 Drawing Sheets

SYSTEM, METHOD, AND APPARATUS FOR ATTRACTING HONEY

RELATED APPLICATIONS

Not applicable.

FIELD OF THE INVENTION

The present invention relates generally to extraction of honey and, more particularly, to an apparatus for extracting honey from silicon honeycomb frames.

BACKGROUND OF THE INVENTION

The process of harvesting honey from honey bees has been practiced for thousands and thousands of years. Honey is an all-natural food that contains natural antioxidants, enzymes, minerals, and vitamins Additionally, honey contains ingredients that are believed to neutralize potential damaging free radical activity. It is also believed that honey promotes the growth of good bacteria in the intestine and may help reduce pollen allergies.

Unfortunately, the process of gathering honey from individual honeycomb frames has remained substantially unchanged from generations. Typically, after collecting the frames, they must be uncapped by removing the beeswax from each cell. Next the frames must be rapidly rotated to remove the honey via a centrifugal process. The honey must then be gathered and filtered to complete the process. Such a process is time consuming and messy. Many manufacturers have responded with the use of reusable silicone frames to help with the process, but very little else in the process has changed.

Accordingly, there exists a need for a means by honey can be gathered from silicone style honeycomb frames in a manner that addresses the shortcomings of the current practice.

SUMMARY OF THE INVENTION

The inventor has recognized the aforementioned, inherent problems and lack in the art and observed that there is a need for a new and improved apparatus for extracting and processing honey from reusable silicone frames. The development of the present invention, which will be described in greater detail herein, fulfills this need.

In an embodiment, the disclosed apparatus for extracting honey from a silicone honeycomb frame includes a base having a central longitudinal axis, a laterally opposed pair of conveyor belts extending parallel with the central longitudinal axis of the base, a drive motor operatively coupled with the pair of conveyor belts, and an opposed pair of scraping spatulas connected to the base and transversing the central longitudinal axis of the base. The pair of conveyor belts is configured to engage the silicone honeycomb frame and move the silicone honeycomb frame along the central longitudinal axis between the pair of scraping spatulas. The pair of scraping spatulas is configured extract the honey from the silicone honeycomb frame as the silicone honeycomb frame passes between the pair of scraping spatulas.

In an embodiment, the disclosed system includes a silicone honeycomb frame configured to support honey and an apparatus for extracting the honey from the silicone honeycomb frame. The apparatus includes a base having a central longitudinal axis. The base includes a first frame rail approximately parallel to the central longitudinal axis, a second frame rail laterally opposed to the first frame rail and approximately parallel to the central longitudinal axis, and an extraction plate connected to the first frame rail and the second frame rail and transversing the central longitudinal axis. The apparatus also includes a drive shaft rotationally connected to the first frame rail and the second frame rail and transversing the central longitudinal axis, a first drive pulley fixed to the drive shaft proximate to the first frame rail, a second drive pulley fixed to the drive shaft proximate to the second frame rail, an idler shaft rotationally connected to the first frame rail and the second frame rail and transversing the central longitudinal axis and longitudinally spaced away from the drive shaft, a first idler pulley fixed to the idler shaft proximate to the first frame rail, a second idler pulley fixed to the idler shaft proximate to the second frame rail, a first conveyor belt operatively connected to the first drive pulley and the first idler pulley, a second conveyor belt operatively connected to the second drive pulley and the second idler pulley, a drive motor operatively coupled with the drive shaft, a upper scraping spatula connected to the first frame rail and the second frame rail and transversing the central longitudinal axis of the base, and a lower scraping spatula connected to the extraction plate and transversing the central longitudinal axis of the base opposite the upper scraping spatula. The system also includes a collection container located under the base of the apparatus to collect the honey extracted from the silicone honeycomb frame. The first conveyor belt and the second conveyor belt are configured to engage the silicone honeycomb frame and linearly move the silicone honeycomb frame along the central longitudinal axis between the upper scraping spatula and the lower scraping spatula. The upper scraping spatula and the lower scraping spatula are configured extract the honey from the silicone honeycomb frame as the silicone honeycomb frame passes between the upper scraping spatula and the lower scraping spatula.

In an embodiment, the disclosed method for extracting honey from a silicone honeycomb frame includes the steps of: 1). positioning the silicone honeycomb frame between a pair of conveyor belts and an extraction plate; 2). linearly moving the silicone honeycomb frame between a pair of scraping spatulas by rotating the pair of conveyor belts; 3). squeezing the honey from the silicone honeycomb frame as the silicone honeycomb frame passed between the pair of scraping spatulas; 4). scraping the honey from opposed surfaces of the silicone honeycomb frame as the silicone honeycomb frame passes between the pair of scraping spatulas; and 5). collecting the honey squeezed and scraped from the silicone honeycomb frame.

Furthermore, the features and advantages described herein may be combined in various manners and embodiments as one skilled in the relevant art will recognize. The embodiment and examples disclosed herein can be practiced without one (1) or more of the features and advantages described in a particular embodiment or example.

Further advantages of the embodiments and examples disclosed herein will become apparent from a consideration of the drawings and ensuing description.

BRIEF DESCRIPTION OF THE DRAWINGS

The advantages and features of the embodiments and examples disclosed herein will become better understood with reference to the following more detailed description and claims taken in conjunction with the accompanying drawings, in which like elements are identified with like symbols, and in which:

Figure 1:
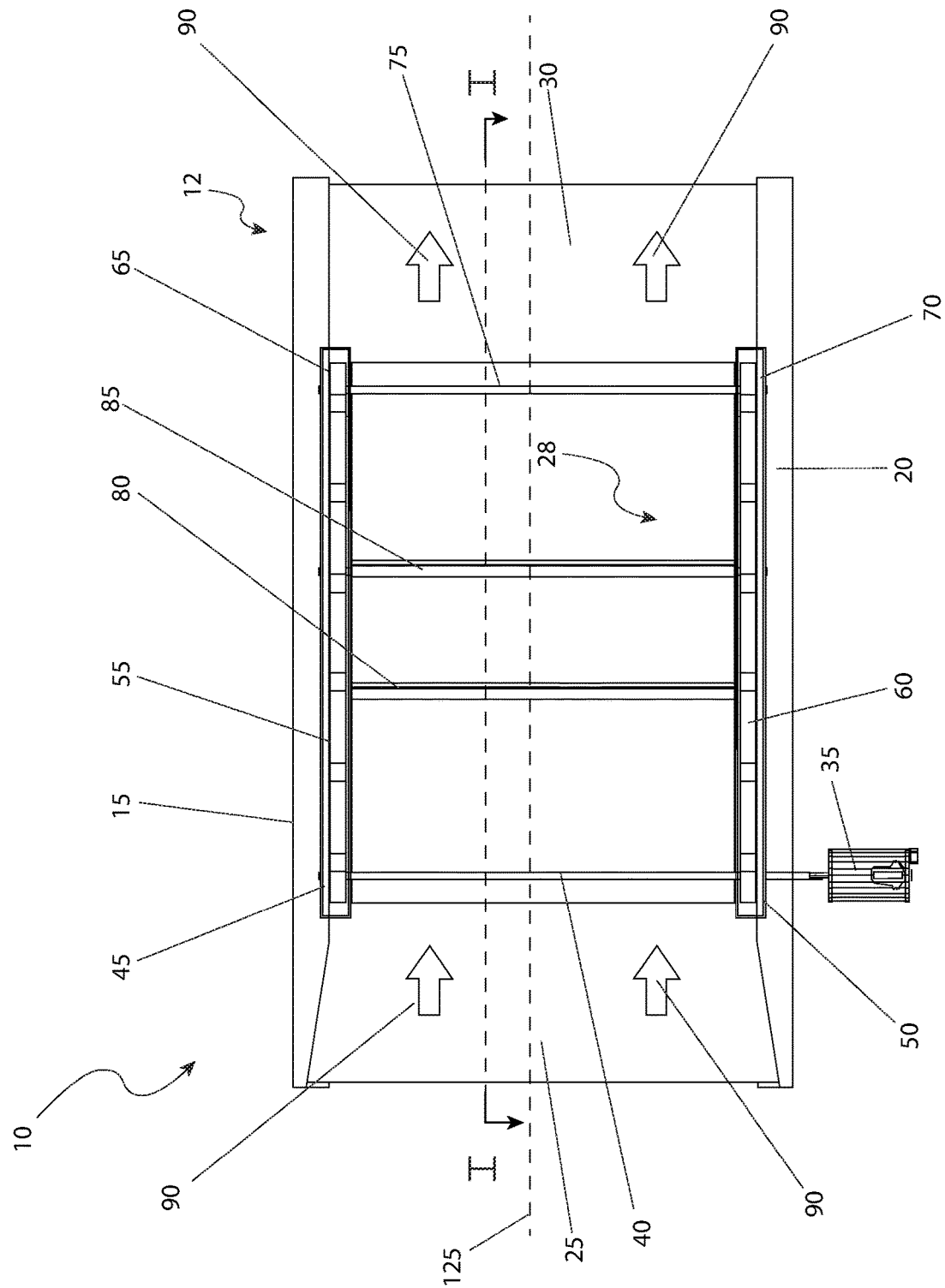
FIG. 1 is a schematic top plan view of an embodiment of the disclosed apparatus for extracting honey from silicone honeycomb frames.

DESCRIPTIVE KEY 10 apparatus
12 base
14 system
15 first frame rail
20 second frame rail
25 entry plate
26 extraction plate
28 opening
30 exit plate
35 drive motor
40 drive shaft
45 first drive pulley
50 second drive pulley
55 first conveyor belt
60 second conveyor belt
62 inner surface
64 outer surface
65 first idler pulley
70 second idler pulley
75 idler shaft
80 first upper scraping spatula
82 squeeze-gap
84 linear dimension
85 second upper scraping spatula
90 travel direction arrow
95 silicone honeycomb frame
96 first surface of silicone honeycomb frame
97 thickness of silicone honeycomb frame
98 second surface of silicone honeycomb frame
100 first mounting structure
105 second mounting structure
110 drive block
115 first belt cover
120 second belt cover
125 center longitudinal axis
130 first lower scraping spatula
135 second lower scraping spatula
140 collection container
145 honey travel path
150 upper flange
155 speed controller
160 power cord
165 AC power outlet
170 variable speed drive

DETAILED DESCRIPTION OF THE PREFERRED EMBODIMENT

In accordance with the invention, the best mode is presented in terms of the illustrative example embodiments, herein depicted within FIGS. 1-7. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one (1) particular configuration may be shown and described for purposes of clarity and disclosure and not by way of limitation of scope.

The terms "a" and "an" herein do not denote a limitation of quantity, but rather denote the presence of at least one (1) of the referenced items.

Figure 2:
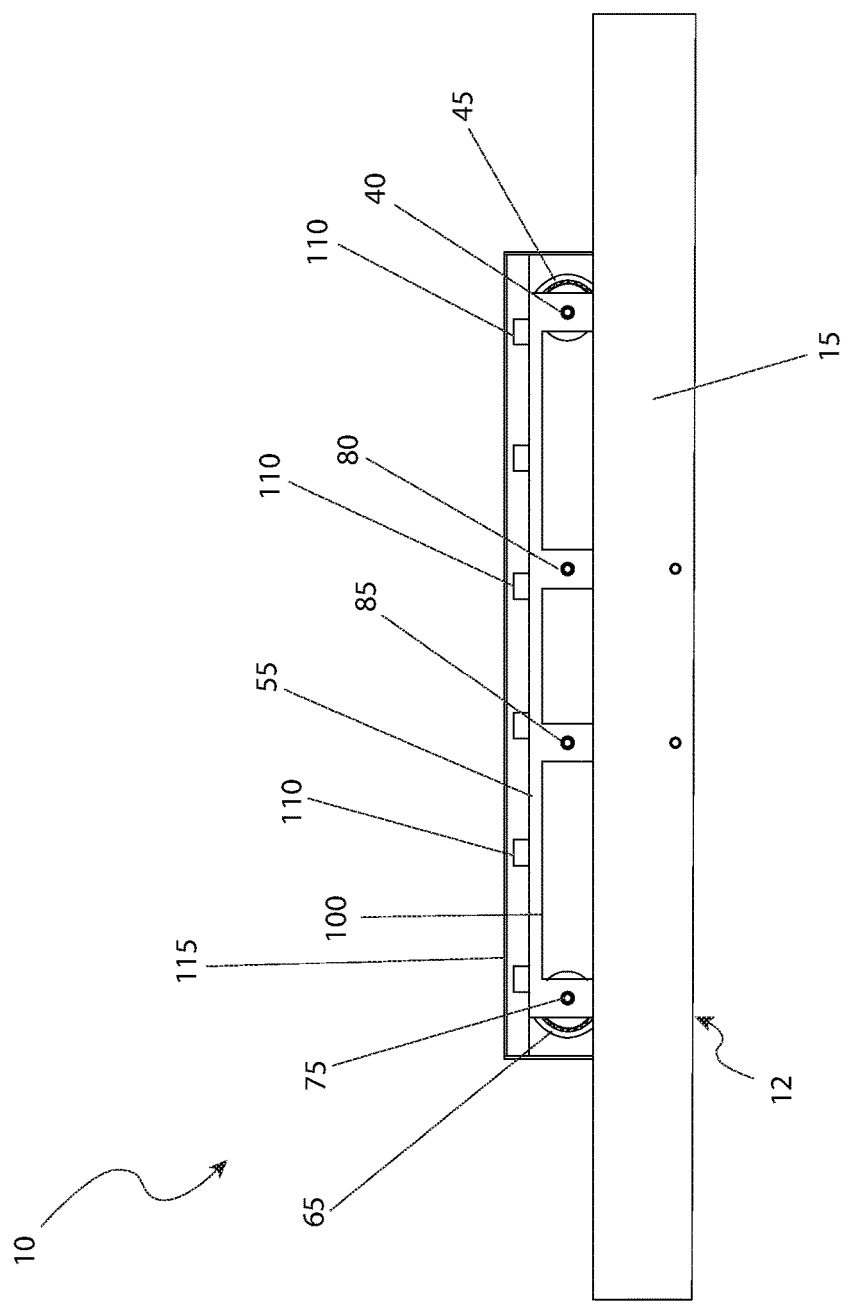
FIG. 2 is a schematic side elevation view of the disclosed apparatus for extracting honey from silicone honeycomb frames of FIG. 1.
Figure 3:
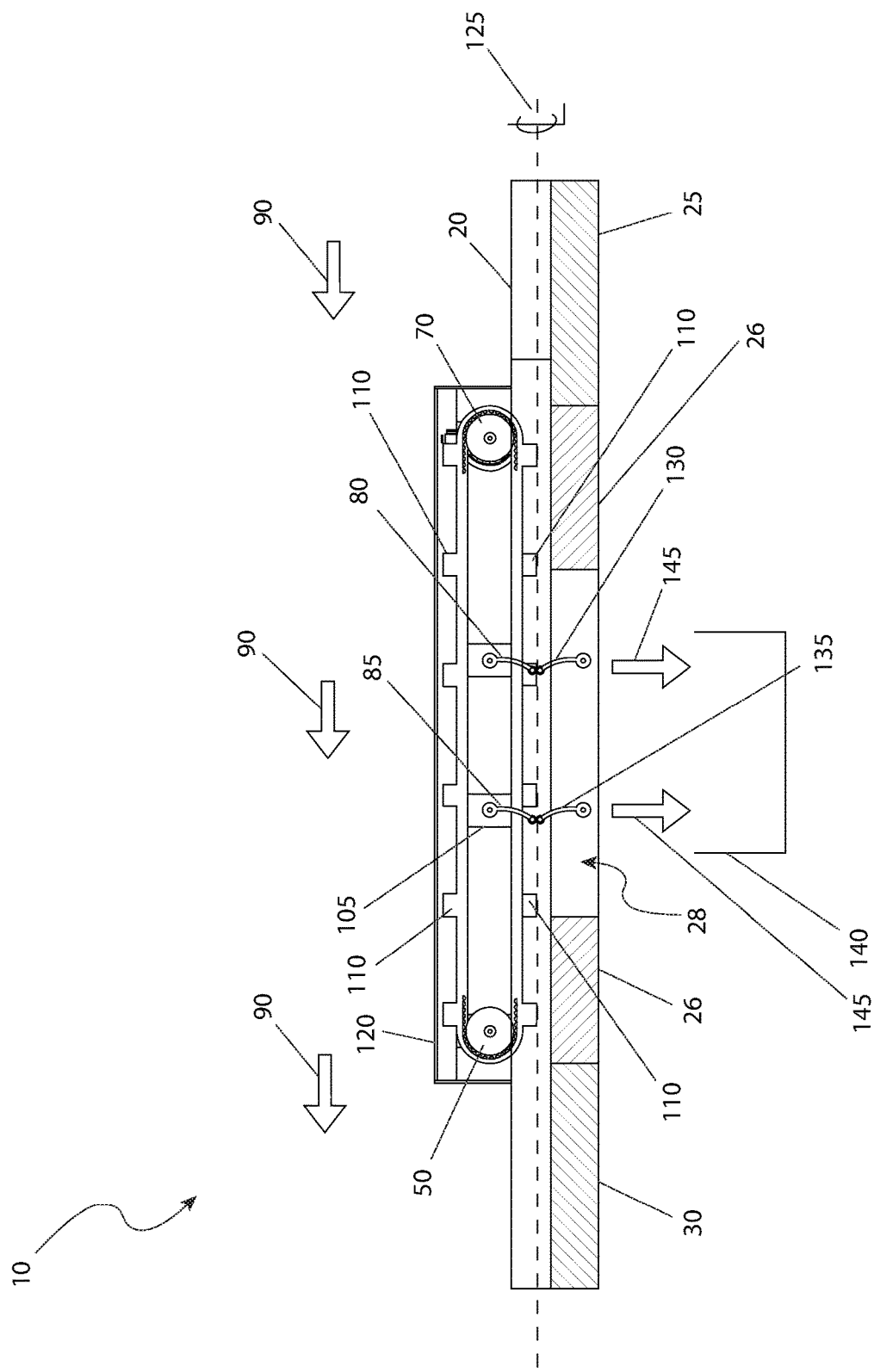
FIG. 3 is schematic side cross-sectional view of the disclosed apparatus for extracting honey from silicone honeycomb frames, taken along a line I-I of FIG. 1.
Figure 4:
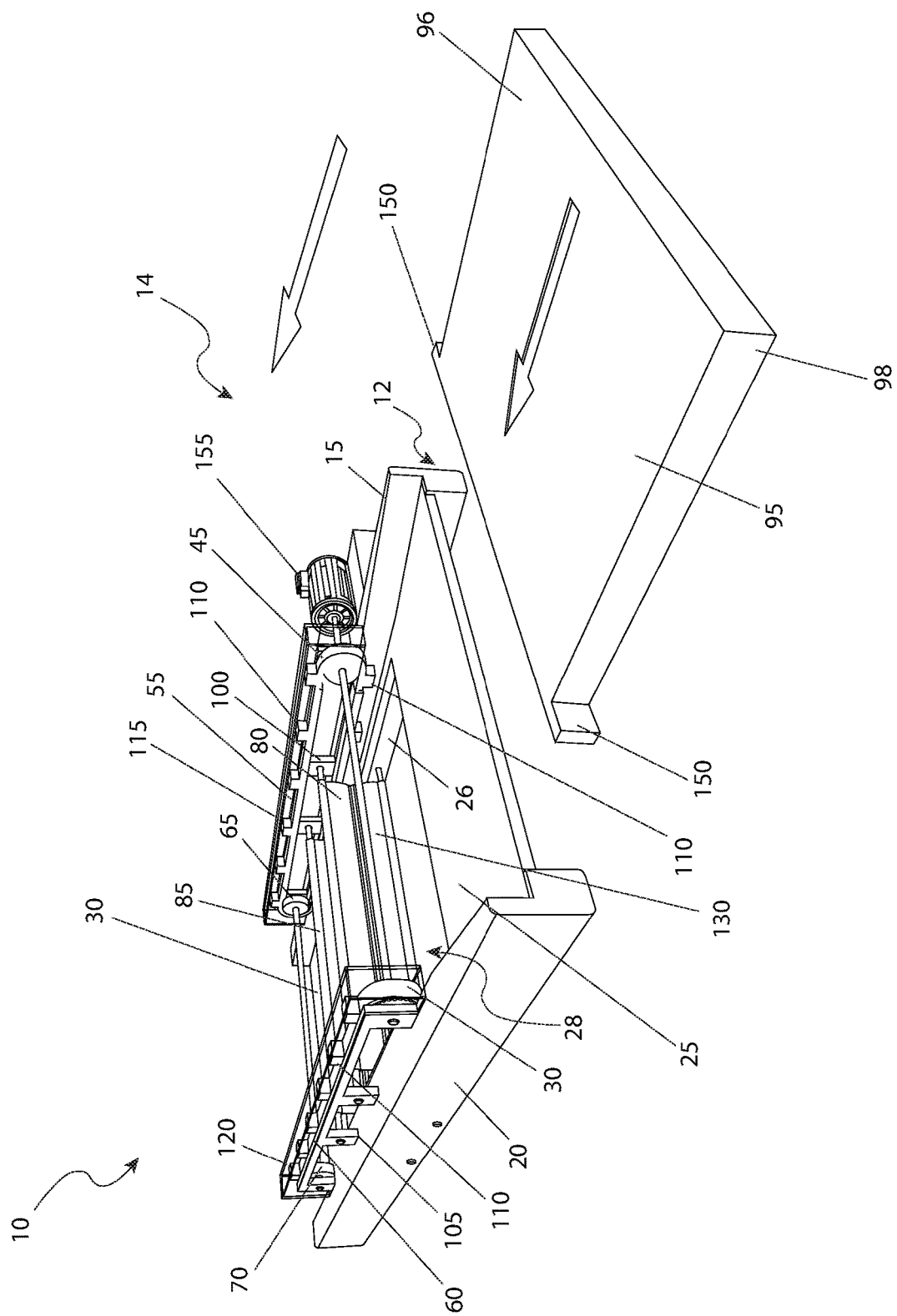
FIG. 4 is a schematic environmental perspective view of the disclosed apparatus for extracting honey from silicone honeycomb frames.

Referring to FIGS. 1-6, disclosed is a system 14 and an apparatus 10 for extracting honey from silicone honeycomb frames 95, where like reference numerals represent similar or like parts. FIGS. 1, 3, and 4 depict travel direction arrows 90 that indicate the travel path of a silicone honeycomb frame 95 (FIG. 4) as it passes through (e.g., enters and exits) the apparatus 10 during extraction of honey from the silicone honeycomb frame 95. FIG. 3 depicts travel direction arrows 145 that indicate the travel path of honey as it is being extracted from the silicone honeycomb frame 95 by the apparatus 10.

Referring to FIG. 1, a schematic top plan view of the apparatus 10, according to an illustrative example embodiment, is disclosed. The apparatus 10 includes a sturdy base 12. In an example construction, the base 12 includes a left frame rail 15, a right frame rail 20, an entry plate 25, and an exit plate 30. In an example construction, the base 12 of the apparatus 10 is approximately one meter (1 m.) long and fifty-eight centimeters (58 cm.) wide. In an example implementation, the apparatus 10 is placed (e.g., sits) on a table or other support stand (not shown) at approximately waist height. A honey collection container 140 (FIG. 3) is positioned underneath the apparatus 10 at an approximately central location.

The apparatus 10 also includes a drive motor 35. In an example, the drive motor 35 is a direct drive variable speed alternating current (AC) motor. The drive motor 35 is axially coupled to a drive shaft 40. The drive shaft 40 extends between and is supported by the left frame rail 15 and the right frame rail 20. The apparatus 10 also includes a left drive pulley 45 and a right drive pulley 50. The drive shaft 40 is also connected to the left drive pulley 45 and the right drive pulley 50. The left drive pulley 45 supports a left conveyor belt 55 at a first (e.g., drive) end of the left conveyor belt 55. The right drive pulley 50 supports a right conveyor belt 60 at a first (e.g., drive) end of the right conveyor belt 60.

The apparatus 10 also includes a left idler pulley 65 and a right idler pulley 70. The left idler pulley 65 supports the left conveyor belt 55 at an opposed second (e.g., idler) end of the left conveyor belt 55. The right idler pulley 70 supports the right conveyor belt 60 at an opposed second (e.g., idler) end of the right conveyor belt 60. The apparatus 10 also includes an idler shaft 75 that interconnects the left idler pulley 65 and the right idler pulley 70.

Further examples of the construction and operation of the left conveyor belt 55 and the right conveyor belt 60 will be provided herein below.

The apparatus 10 also includes a first upper scraping spatula 80 and a second upper scraping spatula 85. In an example construction, the first upper scraping spatula 80 and the second upper scraping spatula 85 are located at the approximate midpoint of the apparatus 10. In an example construction, each one of the first upper scraping spatula 80 and the second upper scraping spatula 85 is supported at opposite ends by the left frame rail 15 and the right frame rail 20, respectively. The first upper scraping spatula 80 and the second upper scraping spatula 85 are formed of semi-rigid material configured to exert a sufficient amount of pressure upon the silicone honeycomb frame 95 (FIG. 4) passing through the apparatus 10. In an example construction, the first upper scraping spatula 80 and/or the second upper scraping spatula 85 is formed of a semi-rigid plastic or other suitable materials.

Referring to FIG. 2, a schematic side elevation view of the apparatus 10, according to the illustrative example embodiment, is depicted. FIG. 2 more clearly shows the left frame rail 15 serving as a portion of the base 12 of the apparatus 10. The apparatus 10 also includes a left mounting structure 100 connected to the left frame rail 15. In an example construction, the left mounting structure 100 is centrally located on and attached to an upper surface of the left frame rail 15. The left mounting structure 100 provides mounting locations for and serves as physical support for one end of the drive shaft 40, one end of the idler shaft 75, one end of the first upper scraping spatula 80, and one end of the second upper scraping spatula 85. In FIG. 2, the left drive pulley 45 and the left idler pulley 65 are partially visible and provide support for the left conveyor belt 55.

Similarly, the apparatus 10 includes a right mounting structure 105 (FIGS. 3 and 4). The right mounting structure 105 is connected to the right frame rail 20. In an example construction, the right mounting structure 105 is centrally located on and attached to an upper surface of the right frame rail 20. The right mounting structure 105 provides mounting locations for and serves as physical support for another end of the drive shaft 40, another end of the idler shaft 75, another end of the first upper scraping spatula 80, and another end of the second upper scraping spatula 85.

Each one of the left drive conveyor belt 55 and the right drive conveyor belt 55 includes a plurality (e.g., a series) of drive blocks 110. The drive blocks 110 project approximately perpendicularly outward from an exterior (or outside) surface of the left drive conveyor belt 55 and the right drive conveyor belt 55. In an example construction, the drive blocks 110 are formed of a rubber material.

The drive blocks 110 of the left drive conveyor belt 55 and the drive blocks 110 of the right drive conveyor belt 60 (FIG. 4) are symmetrically aligned with each other. In an example implementation, the drive blocks 110 are configured to engage (e.g., contact and grab) the silicone honeycomb frame 95 (FIG. 4) in a manner that will be described in greater detail herein below.

The apparatus 10 also includes a left belt cover 115 positioned over the left mounting structure 100. The left belt cover 115 is configured to cover the moving components of the left conveyor belt 55, the drive blocks 110 of the left conveyor belt 55, the left drive pulley 45, and the left idler pulley 65. The apparatus 10 also includes a right belt cover 120 (FIG. 4) 115 positioned over the right mounting structure 105. The right belt cover 120 is configured to cover the moving components of the right conveyor belt 60, the drive blocks 110 of the right conveyor belt 60, the right drive pulley 45, and the right idler pulley 65.

In FIG. 4, the left belt cover 115 and the right belt cover 120 are shown as transparent for clarity of illustration. In an example construction, the left belt cover 115 and the right belt cover 120 may be made of a transparent plastic material to allow an operator to view the left conveyor belt 55 and the right conveyor belt 60 during operation in order to identify and correct any malfunctions of the apparatus 10, for example, due to belt misalignment or clogging.

Referring to FIG. 3, a schematic side cross-sectional view of the apparatus 10, taken along a section line I-I of FIG. 1, according to the illustrative example embodiment, is disclosed. FIG. 3 depicts a more detailed view of the interior components of the apparatus 10. The silicone honeycomb frame 95 (FIG. 4) moves through the apparatus 10 along a centerline travel path 125 of the apparatus 10 in the direction of travel direction arrows 90. As the silicone honeycomb frame 95 (FIG. 4) moves along the centerline travel path 125, the silicone honeycomb frame 95 makes contact with the first upper scraping spatula 80 and the second upper scraping spatula 85. Additionally, the silicone honeycomb frame 95 also makes contact with a first lower scraping spatula 130 and a second lower scraping spatula 135. Such contact forces honey from the silicone honeycomb frame 95 into the collection container 140 along the honey travel path 145 via a mechanical squeezing and scraping contact between opposite ones of the first upper scraping spatula 80 and the first lower scraping spatula 130 and opposite ones of the second upper scraping spatula 85 and the second lower scraping spatula 135. The silicone honeycomb frame 95 (FIG. 4) moves along the centerline travel path 125 by contact with the aligned drive blocks 110 of both the left conveyor belt 55 and the right conveyor belt 60.

Referring to FIG. 4, a schematic environmental perspective view of the apparatus 10, according to the illustrative example embodiment, is disclosed. FIG. 4 depicts the transfer and movement process of the silicone honeycomb frame 95 through the apparatus 10. The transfer of the silicone honeycomb frame 95 is accomplished when the drive blocks 110 of both the left conveyor belt 55 and the right conveyor belt 60 engage upper flanges 150 on the silicone honeycomb frame 95 when the silicone honeycomb frame 95 is placed upon the entry plate 25. As a lower portion of the silicone honeycomb frame 95, opposite the upper flanges 150, clears the entry plate 25, another silicone honeycomb frame 95 can be placed upon the entry plate 25 for near continuous operation.

After the silicone honeycomb frame 95 has been processed through the apparatus 10, it is removed from the exit plate 30 and returned to the hive. As such, the operation of clearing the honey from the silicone honeycomb frame 95 is near continuous in operation and is significantly faster than what is typically afforded by conventional honeycomb clearing operations. The speed at what the silicone honeycomb frame 95 is carried through the apparatus 10 can be adjusted by the operator with a speed controller 155. The speed may vary, for example, based upon experience of the operator, current ambient weather conditions, type and/or quality of the honey, and other variable factors.

Figure 5:
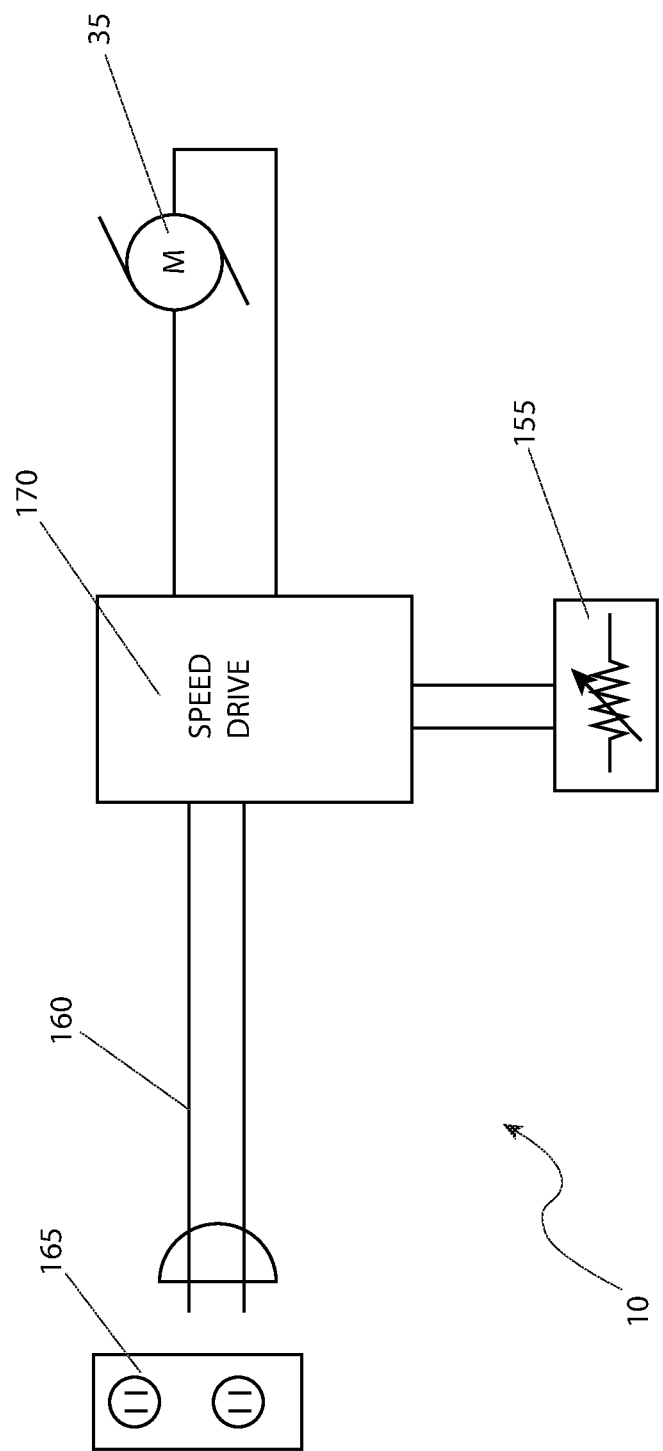
FIG. 5 is a schematic functional electrical block diagram of an embodiment of the disclosed apparatus for extracting honey from silicone honeycomb frames.
Figure 6:
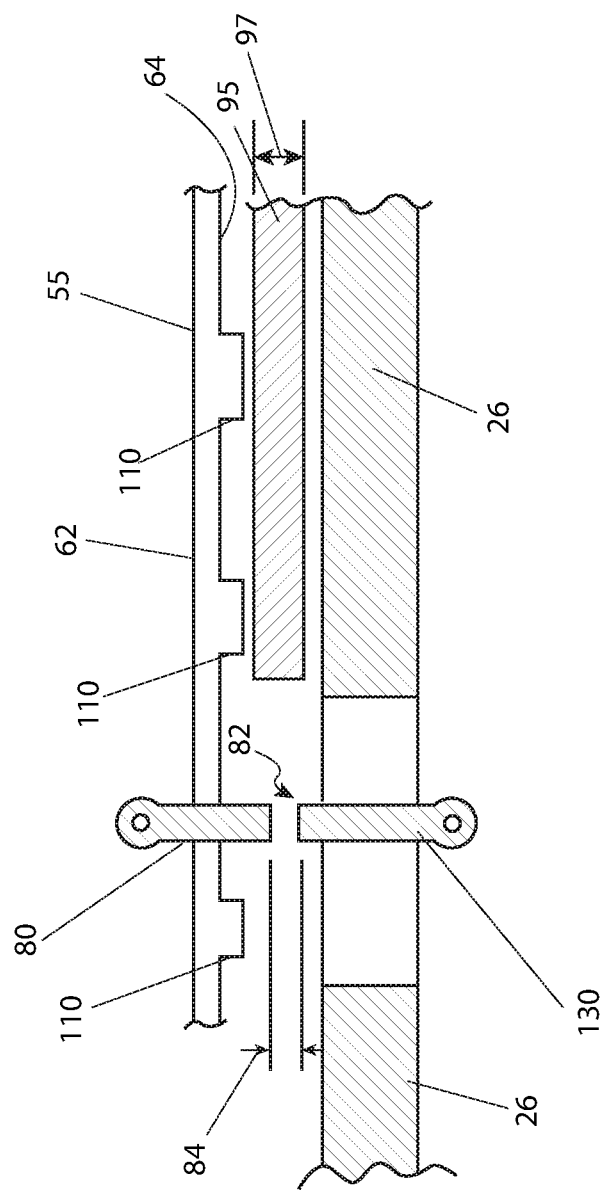
FIG. 6 is a schematic partial side elevation view, in section, of an embodiment of the disclosed for apparatus for extracting honey from silicone honeycomb frames; and, FIG. 7 is a flow diagram illustrating an embodiment of the disclosed method for extracting honey from a silicone honeycomb frame.

Referring to FIG. 5, a schematic functional electrical block diagram of the apparatus 10, according to an illustrative example embodiment, is disclosed. AC electrical power is provided by a power cord 160 from an AC power outlet 165 as is customarily available. Power is passed to a variable speed drive 170, which receives speed commands from the speed controller 155. The resultant controlled AC waveform is directed to the drive motor 35.

Referring to FIGS. 1-5, in an example embodiment, the apparatus 10 includes the base 12. The base 12 includes the first (e.g., left) frame rail 15, the second (e.g., right) frame rail 20, the entry plate 25, and the exit plate 30. The apparatus 10 also includes the first (e.g., left) drive pulley 45, the second (e.g., right) drive pulley 50, the drive shaft 40 supported by the first frame rail 15 and the second frame rail 20 and operably connected to (e.g., between) the first drive pulley 45 and the second drive pulley 50. The apparatus 10 also includes the first (e.g., left) idler pulley 65, the second (e.g., right) idler pulley 70, and the idler shaft 75 supported by the first frame rail 15 and the second frame rail 20 and operably connected to (e.g., between) the first idler pulley 65 and the second idler pulley 70. The apparatus 10 also includes the first (e.g., left) conveyor belt 55 in mechanical communication with the first drive pulley 45 and the first idler pulley 65 and the second (e.g., right) conveyor belt 60 in mechanical communication with the second drive pulley 50 and the second idler pulley 70. The apparatus 10 also includes the drive motor 35 in mechanical communication with the drive shaft 40. The apparatus 10 also includes the first upper scraping spatula 80 supported on the first frame rail 15 and the second frame rail 20 and the second upper scraping spatula 85 supported on the first frame rail 15 and the second frame rail 20. The apparatus 10 also includes the first lower scraping spatula 130 supported on the first frame rail 15 and the second frame rail 20 and the second lower scraping spatula 135 supported on the first frame rail 15 and the second frame rail 20. The first conveyor belt 55 includes a plurality of first (e.g., left) drive blocks 110 attached to the first conveyor belt 55. The second drive conveyor belt 60 includes a plurality of second (e.g., right) drive blocks 110 attached to the second conveyor belt 60. The plurality of first drive blocks 110 and the plurality of second drive blocks 110 are configured to support the silicone honeycomb frame 95. The drive motor 35 selectively and operably motions the first conveyor belt 55 and the second conveyor belt 60. The silicone honeycomb frame 95 moves when the silicone honeycomb frame 95 is secured between the plurality of first drive blocks 110 and the plurality of second drive blocks 110. The first upper scraping spatula 80 and the second upper scraping spatula 85 and the first lower scraping spatula 130 and the second lower scraping spatula 135 provide a scraping means to honey within the silicone honeycomb frame 95. The apparatus 10 is capable of permitting the placement of the collection container 140 underneath. The scraping means directs honey to collect into the collection container 140. The apparatus 10 also includes the first (e.g., left) belt cover 115 and the second (e.g., right) belt cover 120.

Referring to FIGS. 1-6, in another example embodiment, the disclosed apparatus 10 includes the base 12 having the central longitudinal axis 125, which defines the centerline travel path of the silicone honeycomb frame 95 through the apparatus 10. The apparatus 10 also includes the laterally opposed pair of conveyor belts 55, 60 extending parallel with the central longitudinal axis 125 of the base 12. The apparatus 10 also includes the drive motor 30 operatively coupled with the pair of conveyor belts 55, 60. The apparatus 10 also includes at least one opposed pair of scraping spatulas 80, 130 and/or 85, 135 connected to the base 12 and transversing the central longitudinal axis 125 of the base 12. The pair of conveyor belts 55, 60 is configured to engage the silicone honeycomb frame 95 and move the silicone honeycomb frame 95 along the central longitudinal axis 125 between the pair of scraping spatulas 80, 130. The pair of scraping spatulas 80, 130 and/or 85, 135 is configured extract the honey from the silicone honeycomb frame 95 as the silicone honeycomb frame 95 passes between the pair of scraping spatulas 80, 130 and/or 85, 135.

Referring to FIGS. 1-6, in another example embodiment, the disclosed apparatus 10 also includes the drive shaft 40 rotationally connected to the base 12 and operatively connected to the drive motor 35. The apparatus 10 also includes the laterally opposed pair of drive pulleys 45, 50 fixed to the drive shaft 40 and rotatable relative to the base 12 together with the drive shaft 40. The apparatus 10 also includes the idler shaft 75 rotationally connected to the base 12 and longitudinally spaced away from the drive shaft 40. The apparatus 10 also includes the laterally opposed pair of idler pulleys 65, 70 fixed to the idler shaft 75 and rotatable relative to the base 12 together with the idler shaft 75. Each conveyor belt 55 or 60 of the pair of conveyor belts 55, 60 is operatively connected to one (1) drive pulley 45 or 50 of the pair of drive pulleys 45, 50 and one idler pulley 65 or 70 of the pair of idler pulleys 65, 70 longitudinally aligned with the one drive pulley 45 or 50.

Referring to FIGS. 1-6, in another example embodiment of the disclosed apparatus 10, each conveyor belt 55 and 60 of the pair of conveyor belts 55, 60 includes an inner surface configured to engage one drive pulley 45 or 50 of the pair of drive pulleys 45, 50 and one idler pulley 65 or 70 of the pair of idler pulleys 65, 70 longitudinally aligned with the one drive pulley 45 or 50. Each conveyor belt 55 and 60 of the pair of conveyor belts 55, 60 also includes an outer surface opposite the inner surface. Each conveyor belt 55 and 60 of the pair of conveyor belts 55, 60 also includes the plurality of drive blocks 110 projecting from the outer surface of the conveyor belt 55, 60. The plurality of drive blocks 110 is configured to engage at least a portion of the silicone honeycomb frame 95.

Referring to FIGS. 1-6, in another example embodiment of the disclosed apparatus 10, the base 12 includes the laterally opposed pair of frame rails 15, 20. The base 12 also includes the entry plate 25 connected to the pair of frame rails 15, 20 and transversing the central longitudinal axis 125 of the base 12. The base 12 also includes the extraction plate 26 connected to the pair of frame rails 15, 20 and transversing the central longitudinal axis 125 of the base 12 proximate to (e.g., at or near) the entry plate 25. The base 12 also includes the exit plate 30 connected to the pair of frame rails 15, 20 and transversing the central longitudinal axis 125 of the base 12 proximate to the extraction plate 26. The entry plate 25 is configured to position the silicone honeycomb frame 95 into contact with the pair of conveyor belts 55, 60 for introduction into the apparatus 10. The exit plate 30 is configured to position the silicone honeycomb frame 95 out from contact with the pair of conveyor belts 55, 60 for withdrawal from the apparatus 10. The extraction plate 26 is configured to position the silicone honeycomb frame 95 to pass through the pair of scraper spatulas 80, 130 and/or 85, 135 for extracting honey.

Referring to FIGS. 1-6, in another example embodiment of the disclosed apparatus 10, the extraction plate 26 includes an opening 28 through which the honey extracted from the silicone honeycomb frame 95 passes.

Referring to FIGS. 1-6, in another example embodiment, the disclosed apparatus 10 also includes the collection container 140 located under the opening 28 in the extraction plate 26 to collect the honey extracted from the silicone honeycomb frame 95.

Referring to FIGS. 1-6, in another example embodiment of the disclosed apparatus 10, the pair of scraping spatulas 80, 130 and/or 85, 135 extend across substantially all of the opening 28 in the extraction plate 26.

Referring to FIGS. 1-6, in another example embodiment of the disclosed apparatus 10, the base 12 also includes the laterally opposed pair of mounting structures 100, 105 connected to the pair of frame rails 15, 20. The upper scraping spatula 80 and/or 85 of the pair of scraping spatulas 80, 130 and/or 85, 135 is connected to the pair of mounting structures 100, 105 and extends downward toward the opening 28 in the extraction plate 26. The lower scraping spatula 130 and/or 132 of the pair of scraping spatulas 80, 130 and/or 85, 135 is connected to the extraction plate 26 and extends upwardly from the opening 28 in the extraction plate 26.

Referring to FIGS. 1-6, in another example embodiment, the disclosed apparatus 10 also includes the pair of belt covers 115, 120 connected to the pair of frame rails 15, 20 to cover the pair of conveyor belts 55, 60.

Referring to FIGS. 1-6, in another example embodiment of the disclosed apparatus 10, the pair of scraping spatulas 80, 130 and/or 85, 135 are spaced apart defining a squeeze-gap 82 between the pair of scraping spatulas 80, 130 and/or 85, 135. The squeeze-gap 82 has a linear dimension 84 that is less than a thickness 97 of the silicone honeycomb frame 95.

Referring to FIGS. 1-6, in another example embodiment of the disclosed apparatus 10, the linear dimension 84 of the squeeze-gap 82 is configured such that the pair of scraping spatulas 80, 130 and/or 85, 135 scrape the honey from opposed surfaces 96, 98 of the silicone honeycomb frame 95 as the silicone honeycomb frame 95 passes between the pair of scraping spatulas 80, 130 and/or 85, 135.

Referring to FIGS. 1-6, in another example embodiment of the disclosed apparatus 10, the linear dimension 84 of the squeeze-gap 82 is configured such that the pair of scraping spatulas 80, 130 and/or 85, 135 squeeze the honey from the silicone honeycomb frame 95 as the silicone honeycomb frame 95 passes between the pair of scraping spatulas 80, 130 and/or 85, 135.

Referring to FIGS. 1-6, in another example embodiment of the disclosed apparatus 10, wherein each scraping spatula 80 and 130 or 85 and 135 of the pair of scraping spatulas 80, 130 or 85, 135 is configured to deflect in a direction of movement of the silicone honeycomb frame 95 as the silicone honeycomb frame passes between the pair of scraping spatulas 80, 130 or 85, 135.

Referring to FIGS. 1-6, in another example embodiment, the disclosed apparatus 10 also includes the speed controller electrically connected to the drive motor and configured to controllably adjust a rotational speed of pair of conveyor belts.

Referring to FIGS. 1-6, an example of the disclosed system 14 includes the silicone honeycomb frame 95 configured to support honey and the apparatus 10 for extracting the honey from the silicone honeycomb frame 95. The apparatus 10 includes the base 12 having the central longitudinal axis 125. The base 12 includes the first frame rail 15, approximately parallel to the central longitudinal axis 125; the second frame rail 20, laterally opposed to the first frame rail 15 and approximately parallel to the central longitudinal axis 125; and the extraction plate 26, connected to the first frame rail 15 and the second frame rail 20 and transversing the central longitudinal axis 125. The apparatus 10 also includes the drive shaft 40 rotationally connected to the first frame rail 15 and the second frame rail 20 and transversing the central longitudinal axis 125. The apparatus 10 also includes the first drive pulley 45 fixed to the drive shaft 40 proximate to the first frame rail 15 and the second drive pulley 50 fixed to the drive shaft 50 proximate to the second frame rail 20. The apparatus 10 also includes the idler shaft 75 rotationally connected to the first frame rail 15 and the second frame rail 20 and transversing the central longitudinal axis 125 and longitudinally spaced away from the drive shaft 40. The apparatus 10 also includes the first idler pulley 65 fixed to the idler shaft 75 proximate to the first frame rail 15 and the second idler pulley 70 fixed to the idler shaft 75 proximate to the second frame rail 20. The apparatus 10 also includes the first conveyor belt 55 operatively connected to the first drive pulley 45 and the first idler pulley 65 and the second conveyor belt 60 operatively connected to the second drive pulley 50 and the second idler pulley 70. The apparatus 10 also includes the drive motor 35 operatively coupled with the drive shaft 40. The apparatus 10 also includes the upper scraping spatula 80, connected to the first frame rail 15 and the second frame rail 20 and transversing the central longitudinal axis 125 of the base 12, and the lower scraping spatula 130, connected to the extraction plate 26 and transversing the central longitudinal axis 125 of the base 12 opposite the upper scraping spatula 80. The system 14 also includes the collection container 140 located under the base of 12 the apparatus 10 to collect the honey extracted from the silicone honeycomb frame 95. The first conveyor belt 55 and the second conveyor belt 60 are configured to engage the silicone honeycomb frame 95 and linearly move the silicone honeycomb frame 95 along the central longitudinal axis 125 between the upper scraping spatula 80 and the lower scraping spatula 130. The upper scraping spatula 80 and the lower scraping spatula 130 are configured extract the honey from the silicone honeycomb frame 95 as the silicone honeycomb frame 95 passes between the upper scraping spatula 80 and the lower scraping spatula 130.

Referring to FIGS. 1-6, in another example of the disclosed system 14, the silicone honeycomb frame 95 includes an opposed pair of flanges 150 located at and extending outwardly from an end of the silicone honeycomb frame 95. Each of the first conveyor belt 55 and the second conveyor belt 60 includes the inner surface 62, the outer surface 64 opposite the inner surface 62, and the plurality of drive blocks 110 projecting from the outer surface 64. The plurality of drive blocks 110 are configured to engage the pair of flanges 150 of the silicone honeycomb frame 95.

Referring to FIGS. 1-6, in another example of the disclosed system 14, the extraction plate 26 includes the opening 28 through which the honey extracted from the silicone honeycomb frame 95 passes. The upper scraping spatula 80 extends downward toward the opening 28 in the extraction plate 26. The lower scraping spatula 130 extends upwardly from the opening 28 in the extraction plate 26. Each of the upper scraping spatula 80 and the lower scraping spatula 130 extends across substantially all of the opening 28 in the extraction plate 26.

Referring to FIGS. 1-6, in another example of the disclosed system 14, the upper scraping spatula 80 is a first upper scraping spatula and the lower scraping spatula 130 is a first lower scraping spatula. The apparatus 10 also includes the second upper scraping spatula 85, connected to the first frame rail 15 and the second frame rail 20 and transversing the central longitudinal axis 125 of the base 12 and longitudinally spaced away from the first upper scraping spatula 80, and the second lower scraping spatula 135 connected to the extraction plate 26 and transversing the central longitudinal axis 125 of the base 12 opposite the second upper scraping spatula 85.

Referring to FIGS. 1-6, in another example of the disclosed system 14, the upper scraping spatula 80 and the lower scraping spatula 130 are spaced apart defining the squeeze-gap 82 between the upper scraping spatula 80 and the lower scraping spatula 130. The squeeze-gap 82 has a linear dimension 84 that is less than a thickness 97 of the silicone honeycomb frame 95. The linear dimension 84 of the squeeze-gap 82 is configured such that the upper scraping spatula 80 and the lower scraping spatula 130 scrape the honey from opposed surfaces 96, 98 of the silicone honeycomb frame 95 and squeeze the honey from the silicone honeycomb frame 95 as the silicone honeycomb frame 95 passes between the upper scraping spatula 80 and the lower scraping spatula 130.

Examples of the disclosed apparatus 10 can be utilized by the common user in a simple manner. It is envisioned that the apparatus 10 would be constructed in general accordance with FIGS. 1-5.

After procurement, the apparatus 10 is positioned on an elevated surface with the honey collection container 140 located underneath. Next, the silicone honeycomb frame 95, for example, in quantities of 1 to hundreds or more, are collected from hives and transported to the location of the apparatus 10. Alternately, the apparatus 10 may be transported as needed to the location of the hives. Then, with the drive motor 35 activated and moving at a desired speed, for example, as set by the speed controller 155, an individual silicone honeycomb frame 95 is placed upon the entry plate 25 such that the upper flanges 150 are in position to be grasped by the next set of drive blocks 110 of the left drive conveyor belt 55 and the right drive conveyor belt 60. Next, as the silicone honeycomb frame 95 is pulled in between the first upper scraping spatula 80 and the first lower scraping spatula 130 as well as the second upper scraping spatula 85 and the second lower scraping spatula 135, the resultant expelled honey falls along the honey travel path 145 into the collection container 140. Such a process repeats in a cyclical manner with each silicone honeycomb frame 95 that is processed. The emptied silicone honeycomb frame 95 is then returned to the hive completing the process.

Figure 7:
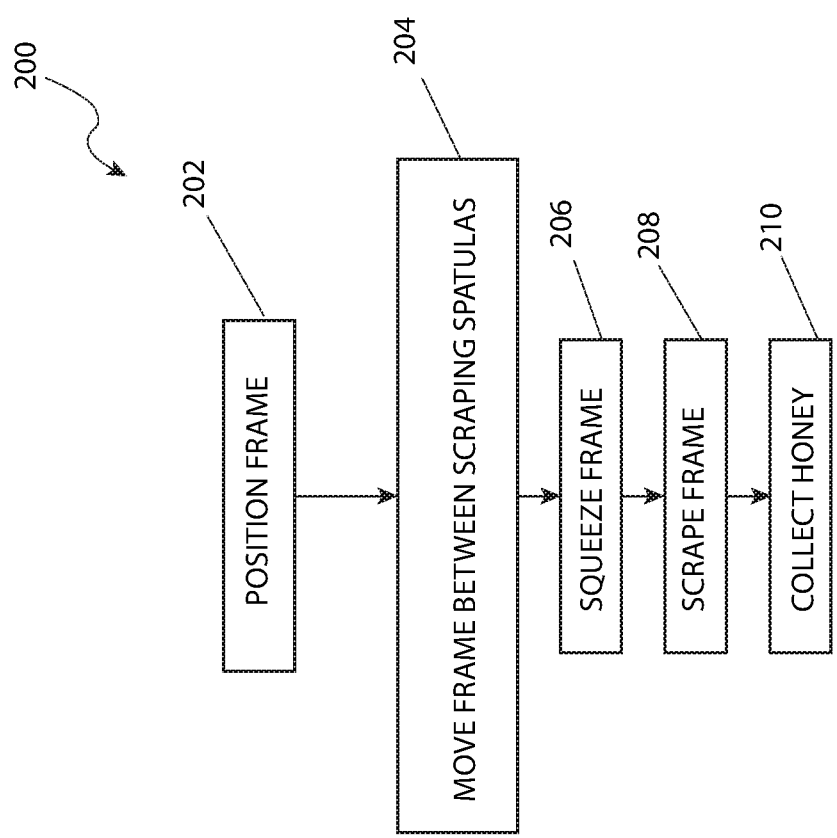

Referring particularly to FIG. 7 and generally to FIGS. 1-6, also disclosed is an example embodiment of a method 200 for extracting honey from the silicone honeycomb frame 95. The method 200 includes the step of positioning the silicone honeycomb frame 95 between a pair of conveyor belts 55, 60 and the extraction plate 26, as shown at block 202. The method 200 also includes the step of linearly moving the silicone honeycomb frame 95 between a pair of scraping spatulas 80, 130 and/or 85, 135 by rotating the pair of conveyor belts 55, 60, as shown at block 204. The method 200 also includes the step of squeezing the honey from the silicone honeycomb frame 95 as the silicone honeycomb frame 95 passed between the pair of scraping spatulas 80, 130 and/or 85, 135, as shown at block 206. The method 200 also includes the step of scraping the honey from opposed surfaces 96, 98 of the silicone honeycomb frame 95 as the silicone honeycomb frame 95 passes between the pair of scraping spatulas 80, 130 and/or 85, 135, as shown at block 208. The method 200 also includes the step of collecting the honey squeezed and scraped from the silicone honeycomb frame 95, as shown at block 210.

The exact specifications, materials used, and method of use may vary upon manufacturing.

As used herein, the terms "first," "second," etc. are used merely as labels and do not impose any positional or hierarchical requirements on the item to which the term refers. Further, as used herein, the terms "left," "right," "upper," "lower," "inside," "outside," and similar terms are used merely to reference relative example positions of the item to which the term refers, for example, as illustrated in the accompanying drawings.

As used herein, the term "approximately" represents a state (e.g., an amount, a position, etc.) that is close to the described state (e.g., amount, position, etc.). For example, the term "approximately" may refer to a state that is within less than 10% of the described state. Further, as used herein, the term "substantially" may include exactly and similar, which is to an extent that it may be perceived as being exact. For example, the term "substantially" may refer to a variance of plus or minus five percent (+/−5%) from exact or actual.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. An apparatus for extracting honey from a silicone honeycomb frame, said apparatus comprising:
   a base having a central longitudinal axis;
   a laterally opposed pair of conveyor belts extending parallel with said central longitudinal axis of said base;
   a drive motor operatively coupled with said pair of conveyor belts; and,
   an opposed pair of scraping spatulas connected to said base and transversing said central longitudinal axis of said base, and wherein:
   said pair of conveyor belts is configured to engage said silicone honeycomb frame and move said silicone honeycomb frame along said central longitudinal axis between said pair of scraping spatulas;
   said pair of scraping spatulas is configured extract said honey from said silicone honeycomb frame as said silicone honeycomb frame passes between said pair of scraping spatulas; and
   said pair of scraping spatulas are spaced apart defining a squeeze-gap between said pair of scraping spatulas.

2. The apparatus of claim 1, further comprising:
   a drive shaft rotationally connected to said base and operatively connected to said drive motor;
   a laterally opposed pair of drive pulleys fixed to said drive shaft and rotatable relative to said base together with said drive shaft;
   an idler shaft rotationally connected to said base and longitudinally spaced away from said drive shaft; and,
   a laterally opposed pair of idler pulleys fixed to said idler shaft and rotatable relative to said base together with said idler shaft, and,
   wherein each conveyor belt of said pair of conveyor belts is operatively connected to one drive pulley of said pair of drive pulleys and one idler pulley of said pair of idler pulleys longitudinally aligned with said one drive pulley.

3. The apparatus of claim 1, wherein each conveyor belt of said pair of conveyor belts comprises:
   an inner surface configured to engage one drive pulley of said pair of drive pulleys and one idler pulley of said pair of idler pulleys longitudinally aligned with said one drive pulley;

an outer surface opposite said inner surface; and,
a plurality of drive blocks projecting from said outer surface of said conveyor belt, and
wherein said plurality of drive blocks is configured to engage at least a portion of said silicone honeycomb frame.

4. The apparatus of claim 1, wherein said base comprises:
a laterally opposed pair of frame rails;
an entry plate connected to said pair of frame rails and transversing said central longitudinal axis of said base;
an extraction plate connected to said pair of frame rails and transversing said central longitudinal axis of said base proximate to said entry plate; and,
an exit plate connected to said pair of frame rails and transversing said central longitudinal axis of said base proximate to said extraction plate, and wherein:
said entry plate is configured to position said silicone honeycomb frame into contact with said pair of conveyor belts;
said exit plate is configured to position said silicone honeycomb frame out from contact with said pair of conveyor belts.

5. The apparatus of claim 4, wherein said extraction plate comprises an opening through which said honey extracted from said silicone honeycomb frame passes.

6. The apparatus of claim 5, further comprising a collection container located under said opening in said extraction plate to collect said honey extracted from said silicone honeycomb frame.

7. The apparatus of claim 5, wherein said pair of scraping spatulas extend across substantially all of said opening in said extraction plate.

8. The apparatus of claim 5, wherein:
said base further comprises a laterally opposed pair of mounting structures connected to said pair of frame rails;
an upper scraping spatula of said pair of scraping spatulas is connected to said pair of mounting structures and extends downward toward said opening in said extraction plate; and,
a lower scraping spatula of said pair of scraping spatulas is connected to said extraction plate and extends upwardly from said opening in said extraction plate.

9. The apparatus of claim 5, further comprising a pair of belt covers connected to said pair of frame rails to cover said pair of conveyor belts.

10. The apparatus of claim 1, wherein:
said squeeze-gap has a linear dimension that is less than a thickness of said silicone honeycomb frame.

11. The apparatus of claim 10, wherein said linear dimension of said squeeze-gap is configured such that said pair of scraping spatulas scrape said honey from opposed surfaces of said silicone honeycomb frame as said silicone honeycomb frame passes between said pair of scraping spatulas.

12. The apparatus of claim 10, wherein said linear dimension of said squeeze-gap is configured such that said pair of scraping spatulas squeeze said honey from silicone honeycomb frame as said silicone honeycomb frame passes between said pair of scraping spatulas.

13. The apparatus of claim 10, wherein each scraping spatula of said pair of scraping spatulas is configured to deflect in a direction of movement of said silicone honeycomb frame as said silicone honeycomb frame passes between said pair of scraping spatulas.

14. The apparatus of claim 1, further comprising a speed controller electrically connected to said drive motor and configured to controllably adjust a rotational speed of pair of conveyor belts.

15. A system comprising:
a silicone honeycomb frame configured to support honey; and,
an apparatus for extracting said honey from said silicone honeycomb frame, said apparatus comprising:
a base having a central longitudinal axis, said base comprising:
a first frame rail approximately parallel to said central longitudinal axis;
a second frame rail laterally opposed to said first frame rail and approximately parallel to said central longitudinal axis; and,
an extraction plate connected to said first frame rail and said second frame rail and transversing said central longitudinal axis;
a drive shaft rotationally connected to said first frame rail and said second frame rail and transversing said central longitudinal axis;
a first drive pulley fixed to said drive shaft proximate to said first frame rail;
a second drive pulley fixed to said drive shaft proximate to said second frame rail;
an idler shaft rotationally connected to said first frame rail and said second frame rail and transversing said central longitudinal axis and longitudinally spaced away from said drive shaft;
a first idler pulley fixed to said idler shaft proximate to said first frame rail;
a second idler pulley fixed to said idler shaft proximate to said second frame rail;
a first conveyor belt operatively connected to said first drive pulley and said first idler pulley;
a second conveyor belt operatively connected to said second drive pulley and said second idler pulley;
a drive motor operatively coupled with said drive shaft;
a upper scraping spatula connected to said first frame rail and said second frame rail and transversing said central longitudinal axis of said base; and,
a lower scraping spatula connected to said extraction plate and transversing said central longitudinal axis of said base opposite said upper scraping spatula; and,
a collection container located under said base of said apparatus to collect said honey extracted from said silicone honeycomb frame, and wherein:
said first conveyor belt and said second conveyor belt are configured to engage said silicone honeycomb frame and linearly move said silicone honeycomb frame along said central longitudinal axis between said upper scraping spatula and said lower scraping spatula; and,
said upper scraping spatula and said lower scraping spatula are configured extract said honey from said silicone honeycomb frame as said silicone honeycomb frame passes between said upper scraping spatula and said lower scraping spatula.

16. The system of claim 15, wherein:
said silicone honeycomb frame comprises an opposed pair of flanges located at and extending outwardly from an end of said silicone honeycomb frame;
each of said first conveyor belt and said second conveyor belt comprises:
an inner surface;
an outer surface opposite said inner surface; and, a plurality of drive blocks projecting from said outer surface; and, said plurality of drive blocks are configured to engage said pair of flanges of said silicone honeycomb frame.

17. The system of claim 15, wherein:

said extraction plate comprises an opening through which said honey extracted from said silicone honeycomb frame passes;

said upper scraping spatula extends downward toward said opening in said extraction plate;

said lower scraping spatula extends upwardly from said opening in said extraction plate; and, each of said upper scraping spatula and said lower scraping spatula extends across substantially all of said opening in said extraction plate.

18. The system of claim 15, wherein:

said upper scraping spatula is a first upper scraping spatula;

said lower scraping spatula is a first lower scraping spatula; and, said apparatus further comprises:

a second upper scraping spatula connected to said first frame rail and said second frame rail and transversing said central longitudinal axis of said base and longitudinally spaced away from said first upper scraping spatula; and, a second lower scraping spatula connected to said extraction plate and transversing said central longitudinal axis of said base opposite said second upper scraping spatula.

19. The system of claim 15, wherein:

said upper scraping spatula and said lower scraping spatula are spaced apart defining a squeeze-gap between said upper scraping spatula and said lower scraping spatula;

said squeeze-gap has a linear dimension that is less than a thickness of said silicone honeycomb frame; and, said linear dimension of said squeeze-gap is configured such that said upper scraping spatula and said lower scraping spatula scrape said honey from opposed surfaces of said silicone honeycomb frame and squeeze said honey from said silicone honeycomb frame as said silicone honeycomb frame passes between said upper scraping spatula and said lower scraping spatula.

20. A method for extracting honey from a silicone honeycomb frame, said method comprising:

positioning said silicone honeycomb frame between a pair of conveyor belts and an extraction plate;

linearly moving said silicone honeycomb frame between a pair of scraping spatulas by rotating said pair of conveyor belts;

squeezing said honey from said silicone honeycomb frame as said silicone honeycomb frame passed between said pair of scraping spatulas;

scraping said honey from opposed surfaces of said silicone honeycomb frame as said silicone honeycomb frame passes between said pair of scraping spatulas; and, collecting said honey squeezed and scraped from said silicone honeycomb frame.

* * * * *